M. DECELLE.
Improvement in Rotary-Cultivator.

No. 127,746. Patented June 11, 1872.

Witness,
James A. Wales
Frank R. Tibbitts

Inventor,
Maxime Decelle
By Geo. W. Tibbitts atty.

127,746

UNITED STATES PATENT OFFICE.

MAXIME DECELLE, OF NEWBURG, OHIO.

IMPROVEMENT IN ROTARY CULTIVATORS.

Specification forming part of Letters Patent No. 127,746, dated June 11, 1872.

SPECIFICATION.

I, MAXIME DECELLE, of Newburg, in the county of Cuyahoga and State of Ohio, have invented a new and Improved Machine for Pulverizing the Soil, of which the following is a specification:

This invention relates to a machine for pulverizing the soil preparatory to planting; and consists of a large heavy cylinder or roller, carrying a large number of teeth for cutting up and evenly distributing the surface of the ground. The said cylinder is arranged in a carriage, and connected to the driving-wheels in such a manner that it shall revolve more rapidly than the driving-wheels, whereby the soil may be thoroughly pulverized as the machine passes over it. The cylinder is arranged to be raised and lowered at the will of the operator.

Figure 1:
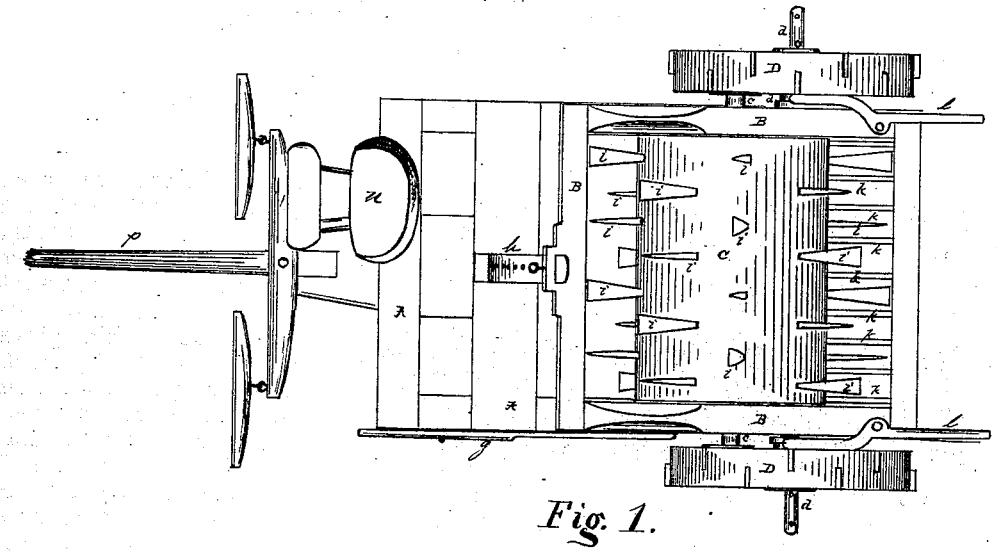
Figure 2:
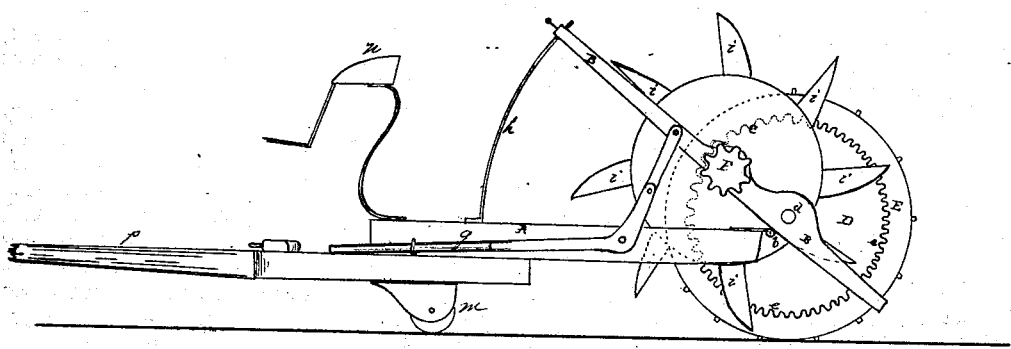

In the drawing, Figure 1 is a plan view. Fig. 2 is a side elevation with a driving-wheel removed.

A in the drawing represents a frame, which supports the working parts of the machine. B is a second frame, hinged at $b$ to the frame A; the frame B supporting and carrying the cylinder C, which is provided with suitable journals $c$ $c$, playing in boxes in the sides of the frame B. At or near the junction of the two frames A and B, on the frame B, are placed axles $d$ for the driving-wheels D D. The driving-wheels D D have a flange, E, on their inside face, provided with gear-teeth $e$, which connect with a pinion, F, on the journals of the cylinder C. The frame B is made to be lowered, for the purpose of bringing the cylinder near the ground, and is operated by the lever $g$ on the side of the frame A. A curved arm, $h$, attached to the frame A and passing through the frame B, serves to hold the two frames in position. The cylinder is provided with teeth $i$ $i$, set in alternate rows, some of which are sharp-edged for cutting the ground, and some broad for lifting and scattering the soil. In the rear side of the frame B are placed a number of teeth, $k$ $k$, between which the teeth $i$ $i$ pass when the cylinder is revolving, which serve as clearers to the teeth $i$ $i$. For the purpose of throwing the driving-wheels out of gear with the pinions F, a lever, $l$, is attached to the frame B, one end of which plays in a groove in the hub of the wheels, by which the wheels D D may be forced outward on their axles, disconnecting them from the pinions, when it is desired to transport the machine, without operating the cylinder. This I propose to change into the form of a clutch on the journals of the cylinder, to be operated by the driver without having to leave his seat. Underneath the forward part of the frame A is caster-wheel $m$, for supporting the machine in front. To the front part of the frame is attached a driver's seat, $n$. The machine is to be drawn by teams attached to the pole or tongue $p$.

By the use of this machine a large surface of ground may be gone over and thoroughly cut up and evenly pulverized; and it may be used to great advantage in the South in the cotton lands, and also on the prairies.

Having thus fully described my invention, what I claim, and desire to secure by Letters Patent, is—

The cylinder C, provided with flat and sharp teeth, alternately arranged and mounted in the frame B, having a series of teeth, $k$, and hinged, as shown, to the main frame; said frame B also carrying the traction driving-wheels D, and having combined with it the lever $g$ for raising or lowering the frame by a single movement, and the device $h$ for supporting the frame when adjusted, all constructed, arranged, and operating substantially as herein described.

MAXIME DECELLE.

Witnesses:
GEO. W. TIBBITS,
FRANK TIBBITTS.